United States Patent
Jankins et al.

(10) Patent No.: US 6,272,400 B1
(45) Date of Patent: Aug. 7, 2001

(54) VACUUM NETWORK CONTROLLER

(75) Inventors: Daniel Jankins, Randolph; John Varone, Seekonk, both of MA (US)

(73) Assignee: Helix Technology Corporation, Mansfield, MA (US)

( * ) Notice: Subject to any disclaimer, the term of this patent is extended or adjusted under 35 U.S.C. 154(b) by 0 days.

(21) Appl. No.: 09/114,549

(22) Filed: Jul. 13, 1998

(51) Int. Cl.$^7$ .................................................. G05D 11/00
(52) U.S. Cl. ............................................. 700/282; 710/11
(58) Field of Search .................................. 700/266, 275, 700/282, 301, 2, 3, 9, 10; 710/11, 12; 709/310

(56) References Cited

U.S. PATENT DOCUMENTS

| | | | |
|---|---|---|---|
| 4,918,930 | 4/1990 | Gaudet et al. ...................... 62/55.5 |
| 5,127,090 | 6/1992 | Ruehle et al. ...................... 395/325 |
| 5,176,004 | 1/1993 | Gaudet ................................. 62/55.5 |
| 5,259,909 | * 11/1993 | Villeneuve et al. ................. 156/345 |
| 5,375,424 | 12/1994 | Bartlett et al. ....................... 62/55.5 |
| 5,448,470 | * 9/1995 | Nishihata et al. ...................... 700/2 |
| 5,590,313 | * 12/1996 | Reynolds et al. ..................... 703/26 |
| 5,754,780 | * 5/1998 | Asakawa et al. .................... 709/208 |
| 5,760,693 | * 6/1998 | Chae .................................... 340/588 |
| 5,971,711 | * 10/1999 | Noji et al. ............................... 417/2 |
| 5,999,886 | * 12/1999 | Martin et al. .......................... 702/31 |
| 6,032,203 | * 2/2000 | Heidhues .............................. 710/11 |
| 6,055,581 | * 4/2000 | Berglund et al. ..................... 710/11 |
| 6,101,419 | * 8/2000 | Kennedy et al. ....................... 700/3 |

FOREIGN PATENT DOCUMENTS

| | | |
|---|---|---|
| 0 369 188 A2 | 5/1990 | (EP) . |
| 0 809 164 A1 | 11/1997 | (EP) . |
| 0 810 499 A2 | 12/1997 | (EP) . |
| 0 918 159 A2 | 5/1999 | (EP) . |
| 90/02878 | 3/1990 | (WO) . |
| 94/19608 | 9/1994 | (WO) . |

* cited by examiner

*Primary Examiner*—William Grant
*Assistant Examiner*—Zoila Cabrera
(74) *Attorney, Agent, or Firm*—Hamilton, Brook, Smith & Reynolds, P.C.

(57) ABSTRACT

A vacuum network controller includes a host interface for interfacing with a host controller, a component interface for interfacing with vacuum system components, a computer-readable medium storing software code, and a processor in communication with each of the preceding elements. The software code generates commands to control the vacuum system components, translates those commands into multiple communication protocols, and communicates the translated commands to the component interface. In a method embedded in a set of computer-translatable instructions, an instruction is received from a host controller. That instruction is processed to generate a command for controlling a vacuum system component. A software driver is selected from a library of drivers for communication protocols, and the selected software driver is used to translate the command into the respective protocol. Finally, the translated command is communicated to a component interface to control the operation of the vacuum system component.

45 Claims, 5 Drawing Sheets

VACUUM NETWORK CONTROLLER

BACKGROUND OF THE INVENTION

A cryogenic vacuum system typically includes at least one cryogenic vacuum pump (cryopump) and at least one compressor for supplying compressed helium to the cryopump. The system also often includes other components such as roughing pumps, waterpumps, turbopumps, chillers, valves and gauges. Together, these components operate to provide cryogenic cooling to a broader system, such as a cluster tool for semiconductor processing.

A cluster tool includes a tool host controller providing top-level control over all systems within the cluster tool. The tool includes a series of processing chambers for performing various semiconductor-fabrication processes such as wafer etching, chemical or plasma vapor deposition, oxidation, sintering, and annealing. These processes often are performed in separate chambers, each of which includes a cryopump of the cryogenic vacuum system.

In addition to the cryopumps, a conventional vacuum system typically includes a network interface terminal which communicates in the RS-232 protocol with the tool host controller and also communicates in the BitBus protocol to the network of cryopumps within the system. Other vacuum system components, such as a roughing pump, compressor, and gate valve, are typically coupled with the tool host controller to allow the tool host controller to issue commands for controlling the operation of these components.

SUMMARY OF THE INVENTION

The network interface terminal of existing systems of the type described, above, provides responsive and custom-tailored control over cryopumps in a cryogenic vacuum system. Nevertheless, the nature of existing systems is limited in the following ways. First, the network interface terminal can only accommodate components that communicate in the protocol in which the terminal is programmed to communicate. The network interface terminal's communication with cryopumps is typically limited to BitBus, while its communication with the host controller is typically limited to RS-232. Nevertheless, a variety of other protocols exist, and many components are designed to communicate in one of these other protocols. A similar problem exists in terms of communicating with the host controller. Further, the control capability of the network interface terminal is limited because its capacity for control is confined primarily to cryopumps in the system. Further still, the limited capabilities of the network interface terminal places a considerable burden on the host controller, in terms of monitoring and controlling vacuum system components. This burden is evidenced in the bundle of cables that typically link various vacuum system components with the host controller.

A vacuum network controller of this invention includes a processor, a computer-readable medium storing computer-executable software code, a host interface for communicating with a host controller, and a component interface for communicating with components. Both interfaces communicate with the processor, as does the computer-readable medium. The software code stored on the computer-readable medium has the capability to perform the following operations: generating commands to control vacuum system components interfaced with the component interface; translating those commands into a plurality of communication protocols; and communicating the translated commands to the component interface.

In a preferred embodiment, the software code is able to translate instructions from a host controller and use these translated instructions as a basis for generating commands.

In another preferred embodiment, the software code is able to translate communications between the vacuum network controller and both the host controller and a vacuum system component to and from more than one of the following communication protocols: BitBus, EtherNet, TCP/IP, RS-232, RS-485, DeviceNet, ProfiBus, and Echelon. In this embodiment, the software code further enables the processor to process data transmitted from components in analog form.

In yet another preferred embodiment, the software code is able to monitor and control the vacuum system by processing operating data from the vacuum system components.

In still another preferred embodiment, the software code is able to generate commands for controlling components other than a cryopump. In various embodiments, the software code can generate commands to control components, such as a roughing pump, a compressor, a turbopump and a gate valve. Further, the software code is responsive to data received from various vacuum system components, such as sensors as well as those listed, above.

A vacuum network of this invention includes a vacuum network controller, as described above, and multiple vacuum system components in communication with the component interface. The plurality of components includes components which respond to different communication protocols.

In a preferred embodiment of this network, a host controller is in communication with the host interface of the vacuum network controller. In other preferred embodiments, a cryopump, roughing pump, compressor, or turbopump is in communication with the component interface of the vacuum network controller. In yet another preferred embodiment, the network includes a remote central controller in communication with the vacuum network controller and also with a plurality of other vacuum network controllers for monitoring and controlling those networks. A final preferred embodiment of the network includes multiple cryopumps in communication with the component interface, with different cryopumps being responsive to different command codes.

A method of this invention is embedded in a set of computer-translatable instructions performed in a controller for controlling a vacuum network. The method includes the steps of receiving an instruction from a host controller, processing the instruction to generate a command for controlling a vacuum system component, translating the command into one of the plurality of communication protocols with the selected component software driver, and communicating the translated command to a component interface to control the operation of the vacuum system component.

One version of this method further includes the step of selecting from a library of component software drivers for different communication protocols to find a driver to translate the command for controlling the vacuum system component. A second version of the method includes the step of translating the instruction received from the host controller into an internal protocol for processing within the vacuum network controller.

In a preferred embodiment of the method, the operation of a cryopump is controlled. In another preferred embodiment, a second command is generated, and a second software driver is selected to translate the second command into a second protocol to control the operation of a second component using a communication protocol distinct from that of the first component. In various versions of this preferred embodiment, the second vacuum system component is a roughing pump, a compressor, a gate valve, or a second cryopump. Another preferred embodiment of this method includes the steps of receiving data from two vacuum system components, such as those just listed, and using that data to diagnose a problem in the vacuum network. A vacuum system component can then be controlled to remedy the problem.

In yet another preferred embodiment of this method, a replacement for an old vacuum system component is auto-configured by building a file of operation parameters for the old component and loading those parameters into a new component installed to replace the old component. Still another preferred embodiment of this method includes the additional steps of identifying vacuum system components in the vacuum network, and building routing tables for distributing data from the vacuum system components and for distributing commands for operating the vacuum network based on the identity of vacuum system components.

The apparatus and methods of this invention offer the following advantages.

First, control over the vacuum network is essentially protocol independent, significantly reducing the difficulty of coordinating use of components that operate under different communication protocols. Protocol independence affords the engineer of the system with greater latitude in selecting components because the protocol by which a component communicates need not be a limiting factor, thus saving costs and increasing functionality within the system. Further, the increased capabilities of the vacuum network controller allow a variety of components to be connected thereto and integrated into the system without having to change the software of a tool host, which is generally very burdensome.

Second, because the vacuum network controller is more broadly integrated into the vacuum network, in comparison to a network interface terminal of the prior art, the vacuum network controller can monitor and control the network with greater responsiveness and with enhanced ability to detect and diagnose problems. For example, by monitoring several components, such as pumps, gauges and valves, the data from each can be used to better triangulate the source of problems. Further, the broader integration of the vacuum network controller allows system-wide problems to be addressed at the system (including the vacuum chamber and subfabrication subsystem) level rather than at the component (e.g., cryopump) level, and the interactions and effects of interactions between components can be better monitored and responded to. Further still, the integrated operation of the vacuum network controller enables improved control coordination over resources such as rough valve mapping and management over the supply and distribution of compressed helium in comparison to the conventional practice of merely "passing the token," wherein resource allocation is sequentially distributed in accordance with a fixed schedule.

Third, the more active role in system management assumed by the vacuum network controller reduces the processing responsibilities of the host controller. The vacuum network controller of this invention increases the functionality of control at a lower level of the system. I.e., many control functions can be carried out by the vacuum network controller rather than having to rely on the host controller to perform these functions. Accordingly, the tool host can have a single point of access to the vacuum system rather than separate points of access for many different components. The increased functionality of the vacuum network controller reduces processing congestion at a tool host controller caused by simultaneous transmissions from multiple vacuum components in conjunction with the processing tasks associated with the operation of other tool components. The greater distribution of processing responsibilities also improves the robustness of the system. If there is a processing failure at one level, processing responsibilities can often be transferred to another level. Finally, the enhancement of lower-level processing increases the speed with which processing functions can be performed.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The features and other details of the method of the invention will now be more particularly described with reference to the accompanying drawings and pointed out in the claims. Numbers that appear in more than one figure represent the same item. It will be understood that the particular embodiments of the invention are shown by way of illustration and not as limitations of the invention. The principal features of this invention can be employed in various embodiments without departing from the scope of the invention.

Figure 1:
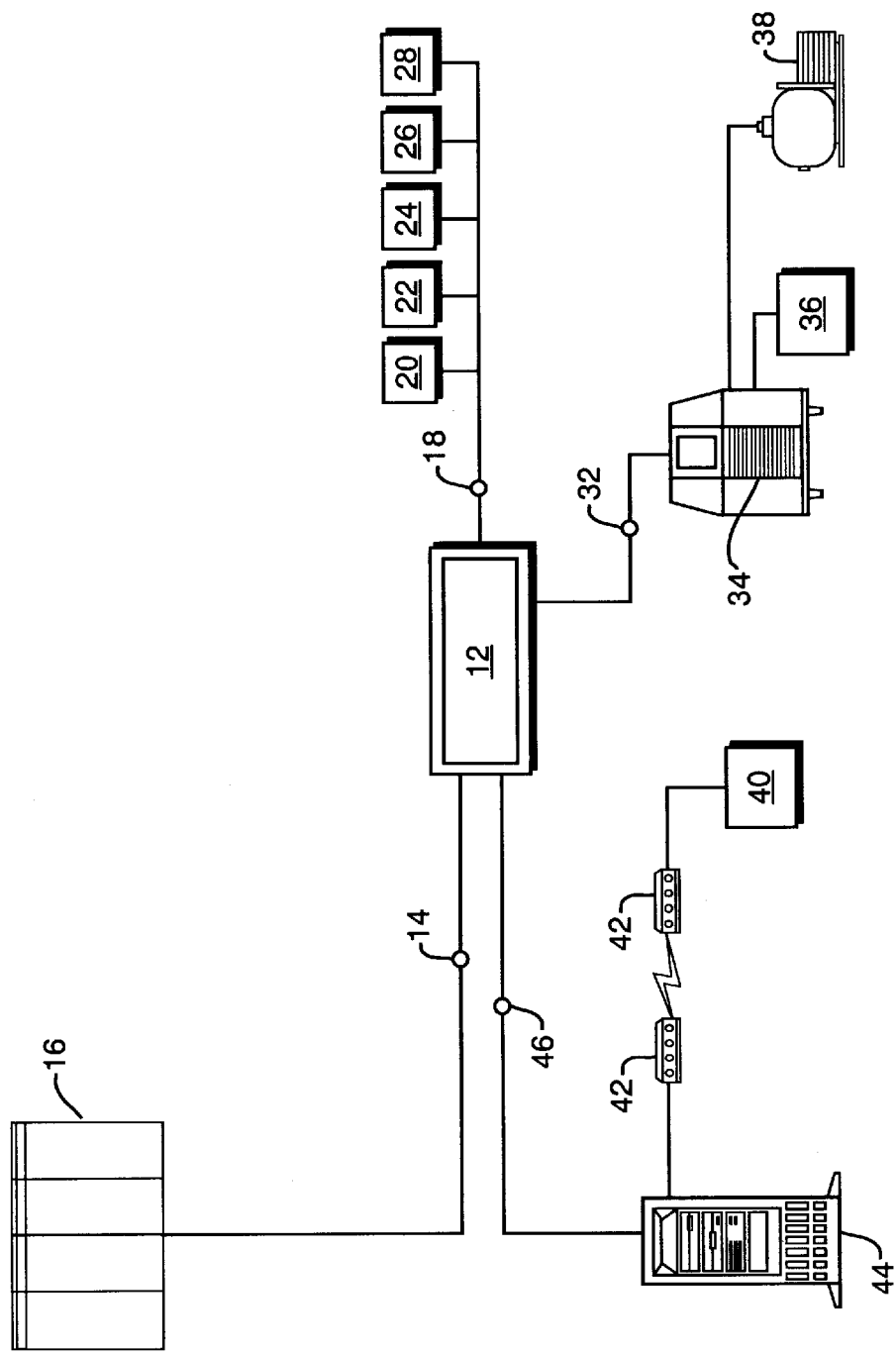
FIG. 1 is a schematic diagram of a cryogenic vacuum network.

A cryogenic vacuum network is illustrated in FIG. 1. The vacuum network includes a vacuum network controller 12 and a host link 14 to a host controller, which in this embodiment is a tool host controller 16. The tool host controller 16 controls the operation of a cluster tool for semiconductor processing. The tool host controller 16 can control the operation of each of the processes (e.g., etching, chemical vapor deposition, and annealing) performed within the cluster tool as well as the operation of the vacuum network.

The vacuum network further includes a component link 18 connected to vacuum system components, such as one or more cryopumps 20, roughing pumps 22, waterpumps 24 and turbopumps 26. The vacuum network also includes the gate valves 28 regulating the opening and closing of the passages between the cryopumps 20 and the respective chambers that the cryopumps 20 are employed to evacuate. The status of each of these components can be monitored and controlled by the vacuum network controller 12. Further still, the vacuum network controller 12, in one embodiment, includes a variety of sensors, including a residual gas analyzer, an ion gauge, and a capacitance manometer. Each component that is added to the network provides additional data which enhances the ability of the vacuum network controller to perform predictive diagnostics on the system. In another embodiment, communication to and from each of the components is daisy chained into a processor within one of the cryopumps 20. Accordingly, this embodiment supplies an additional, lower level of processing capability.

Figure 2:
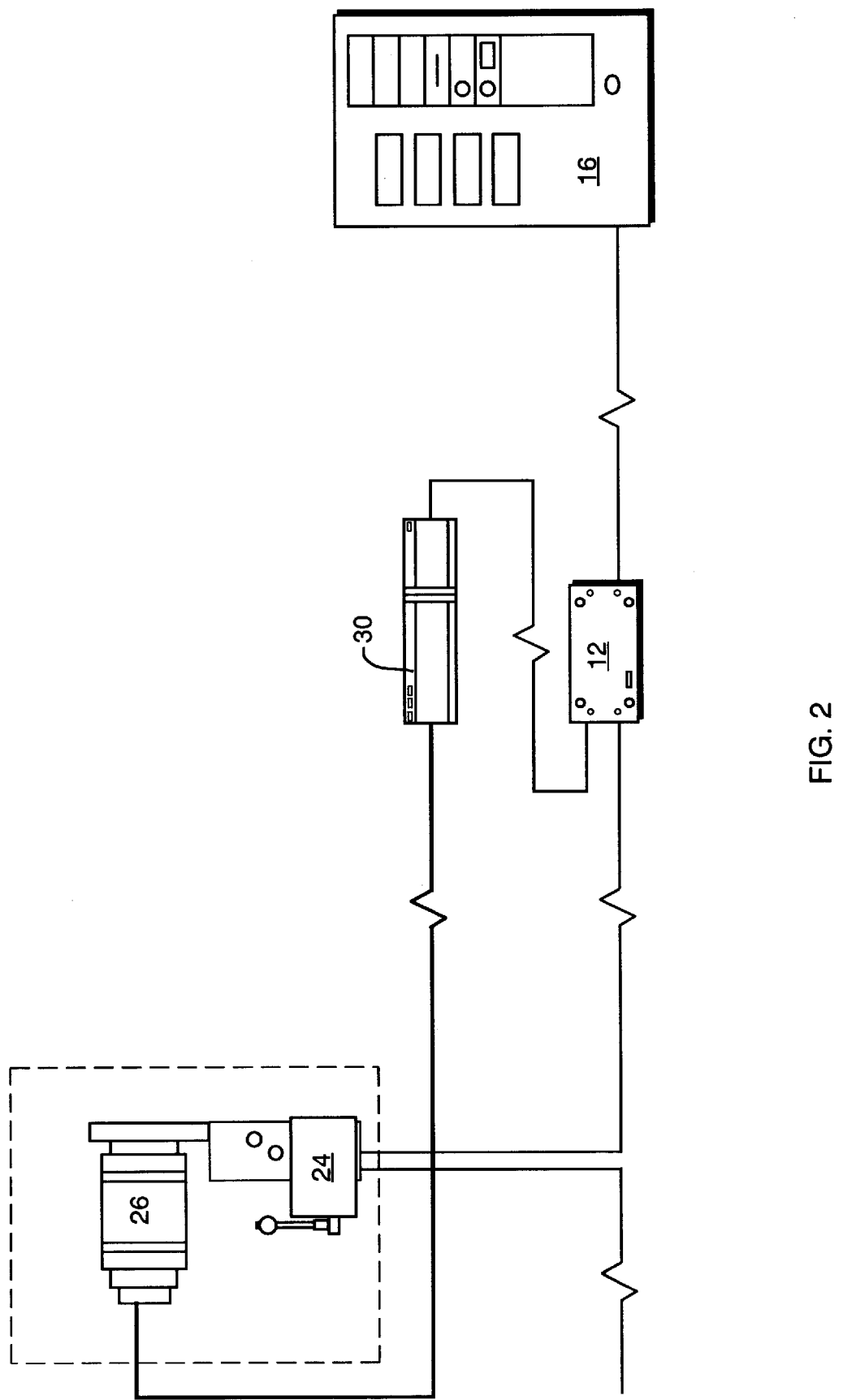
FIG. 2 is a schematic diagram of a cryogenic vacuum network wherein a waterpump has been added.

Because all vacuum system components are connected to the vacuum network controller 12, components can be added or subtracted from the vacuum network without needing to notify or reprogram the tool host controller 16. For example, FIG. 2 illustrates a vacuum network wherein a network interface terminal is replaced with a vacuum network controller 12, and a turbopump 26 and turbo controller 30 are installed in the vacuum network. In this embodiment, communication with the turbopump 26 is routed through the newly-installed vacuum network controller 12. Communication with the existing waterpump 24 is also routed through the vacuum network controller 12. As is more fully discussed below, the vacuum network controller 12 is programmed to survey the identity of components attached to it and to automatically configure those components for operation within the vacuum network. Accordingly, responsibility for managing the newly-installed turbopump 26 can be assumed entirely by the vacuum network controller 12 so that the host controller need not be reprogrammed or burdened with even the knowledge of the presence of turbopump 26 in the system.

Figure 3:
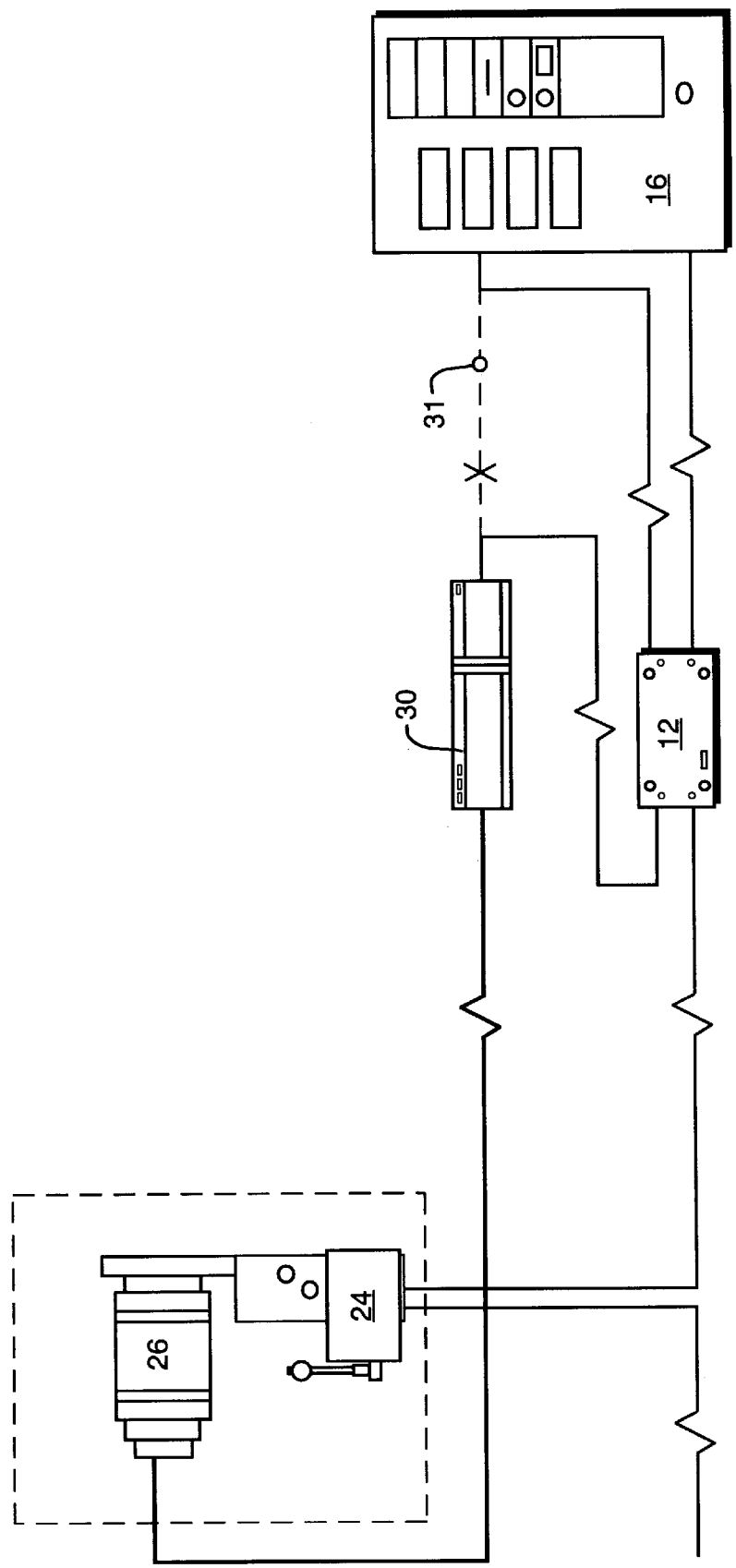
FIG. 3 is a schematic diagram of a cryogenic vacuum network wherein a turbopump has been added.

FIG. 3 illustrates a similar situation, wherein a network interface terminal is replaced with a vacuum network controller 12, and a waterpump 24 is installed in the vacuum network. In this embodiment, communication with the turbopump 26, which was previously routed through a direct link 31 between the host controller 16 and a turbo controller 30, is rerouted through the newly-installed vacuum network controller 12. As in the preceding embodiment, the vacuum network controller 12 assumes full responsibility for monitoring and controlling both the turbopump 26 and the waterpump 24.

Returning to the vacuum network of FIG. 1, the network also includes a subfabrication (subfab) subsystem connected by a subfab link 32. The subfab subsystem includes the machinery needed to support vacuum system components (particularly, the cryopumps 20). In this embodiment, the subfab subsystem includes a compressor 34 for supplying compressed helium gas to the cryopumps 20, a chiller 36 for circulating cooling water through the compressor 34, and a roughing pump 38.

The vacuum network also includes a remote central controller 40 connected, by modem 42, to a server 44 which is joined through a remote link 46 to the vacuum network controller 12. Alternatively, the remote central controller can be connected by other means such as LAN or internet. The remote central controller 40 is similarly linked to many other vacuum networks so that it can remotely monitor and, if necessary, control the operation of each.

Figure 4:
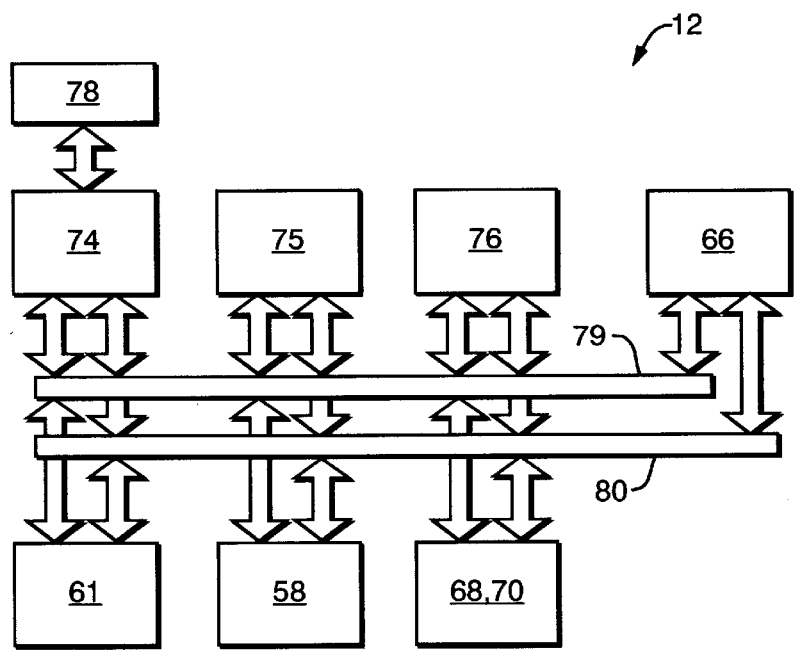
FIG. 4 is a schematic diagram of the hardware in a vacuum network controller.

A schematic diagram of the hardware structure of a vacuum network controller 12 is provided in FIG. 4. A data bus 79 and address bus 80 link each of the illustrated elements and support data communication therebetween.

The vacuum network controller further includes a series of interfaces connected to the buses 79, 80. First, a host interface 61 provides a connection for coupling the vacuum network controller 12 with a tool host controller 16. Second, a component interface includes both a Bitbus interface 68 and one or more other interfaces 70 which provide a connection to vacuum system components. The various interfaces for communicating with vacuum system components are collectively referred to as the "component interface." Third, a service interface 58 provides a connection whereby a technician can interact with the system either locally or remotely. The physical aspects of each interface can vary according to the requirements of the communication protocol(s) that they are designed to accomodate. Fourth, a user interface connects to a terminal or monitor accessible to the user of the network.

Figure 5:
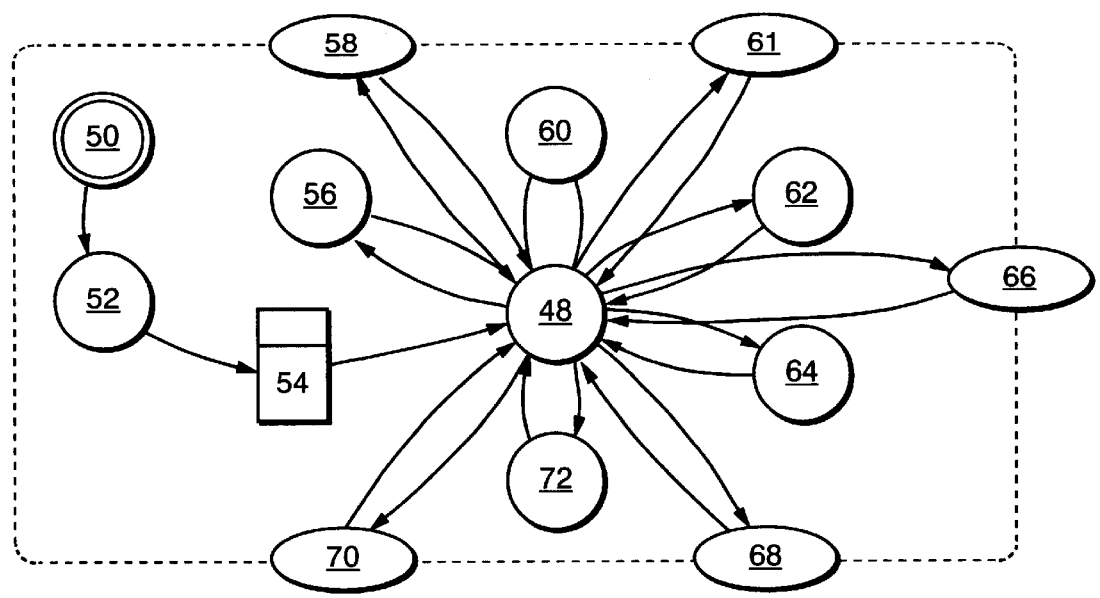
FIG. 5 is a schematic diagram of the operational structure of a vacuum network controller.

A processor 74 drives the operations of the vacuum network controller. Flash storage 75 provides long-term memory storage and supplies the processor 74 with modules for performing an initialization process 52 (FIG. 5). Memory 76 supplies the processor 74 with short-term memory capability. Further, the processor 74 is coupled to an expansion port 78, which allows parallel layers of the structure illustrated in FIG. 4 to be coupled together for increased processing, memory storage, and communication capabilities.

The operational structure of the vacuum network controller 12 is illustrated in FIG. 5. At the center of the communication structure of the vacuum network controller 12 is a message router 48 for directing communications within the vacuum network controller 12. Controller operation commences with a power-up diagnostics process 50, which identifies components coupled with the vacuum network controller 12 and tests the functionality of network hardware and software. During this testing, the vacuum network controller 12 is not available to govern vacuum network operation. The following components are tested: the central processing unit and its associated memory; power supply circuitry; measurement circuitry; input/output interfaces, such as relays, communications, etc. As shown, the power-up diagnostics 50 passes control to an initialization process 52 for initializing the vacuum network controller 12's hardware/software system based on the make-up of attached components identified during the power-up diagnostics 50. Modules are drawn from the flash storage 75 (FIG. 4) in doing so. The initialization process 52 also produces a collection of routing tables 54 that enable the message router 48 to distribute and dynamically link information within the vacuum network controller 12.

A control process 56 supports the monitoring and controlling functions of the vacuum network controller 12. The service interface 58 provides a technician with service access to operations within the vacuum network controller. In a preferred embodiment, the communication port of the service interface 58 communicates in RS-232. However, the architecture can alternatively support various communication protocols. An event generator 60 enables user-definable events to be generated in addition to a standard set of system events. The host interface 61 provides communication to and from the tool host controller 16 (FIG. 1). A global resource control process 62 assumes the responsibility of coordinating and controlling operation of common resources, such as the helium system and the roughing pump 22 (FIG. 1) system. The global resource control process 62 analyzes data collected from various network components to define, to the extent practicable, the most effective and efficient allocation of those common resources. The architecture is further designed to accept additional global resources for monitoring and controlling the vacuum network.

An online/offline diagnostics process 64 performs background diagnostics to ensure proper operation of the vacuum network controller 12 and the vacuum network. Online diagnostics are non-intrusive to the operation of the vacuum network and, therefore, can be performed without disrupting operation of the vacuum network. Meanwhile, offline diagnostics are provided to isolate problems within the vacuum network. Offline diagnostics are intrusive to the operation of the vacuum network and must therefore be performed with the vacuum network, or at least part of the vacuum network, taken "offline." Typically, the offline diagnostics will provide more thorough information regarding operating conditions.

Much of the diagnostic data is forwarded to the user through the graphical user interface 66, where the user can monitor and control the vacuum network controller 12. In one embodiment, a screen or terminal is provided specifically to serve as an interface for the vacuum network user. In an alternative embodiment, the vacuum network controller 12 is provided with a software driver for communicating with a screen or terminal, which is used for other purposes, within the vacuum network.

A standard BitBus interface 68 communicates with vacuum system components that utilize the BitBus protocol. Further, other component interfaces 70 (e.g., DeviceNet, ProfiBus, RS-485, analog) communicate with vacuum system components that utilize these protocols. Each communication protocol has its own software driver. While some protocols can nevertheless share the same interface hardware (i.e., the same physical connector), others require separate interface hardware (due to different pin configurations, for example).

Finally, a logger 72 with the ability to store vacuum network information that can be retrieved locally and/or remotely for analysis is provided. The logger 72 basically keeps a record of all that happens in the vacuum network, including events, conditions, and parameter changes. This information can be stored locally or at a remote site.

Some of these operations have their own processor, others share processors.

The standard operation of an embodiment of a vacuum network controller 12 of this invention includes the following processes. First, as noted above, power-up diagnostics 50 are performed upon start-up of the vacuum network controller 12. Initially, the power-up diagnostics process 50 identifies the components that are in the vacuum network. The diagnostics process 50 then informs the vacuum network controller 12 of the communication protocol and command codes needed to manage the operation of each component. The vacuum network controller 12 then builds routing tables 54 based on its determination of what is connected to the network. The power-up diagnostics 50 further initialize the hardware and software in the network. If a networked component (e.g., a cryopump 20) has been replaced, the new component is auto-configured by loading the configuration parameters of the replaced component into the new component, with the parameters being calibrated to the new component.

Once the network has been initialized and the routing tables 54 established, communication can pass to, from, and through the vacuum network controller 12. The tool host controller 16 will typically maintain a supervisory level of control over the operation of the vacuum network and will issue instructions to the network to perform certain functions in response to the vacuum-related needs of the cluster tool. The tool host controller 16 may also request data from the vacuum network to determine the status of vacuum operations. When issuing instructions, the host controller 16 sends an instruction (e.g., "vacuum on" or "regenerate cryopanel") to the vacuum network controller 12, which receives the instruction at its host interface.

Figure 6:
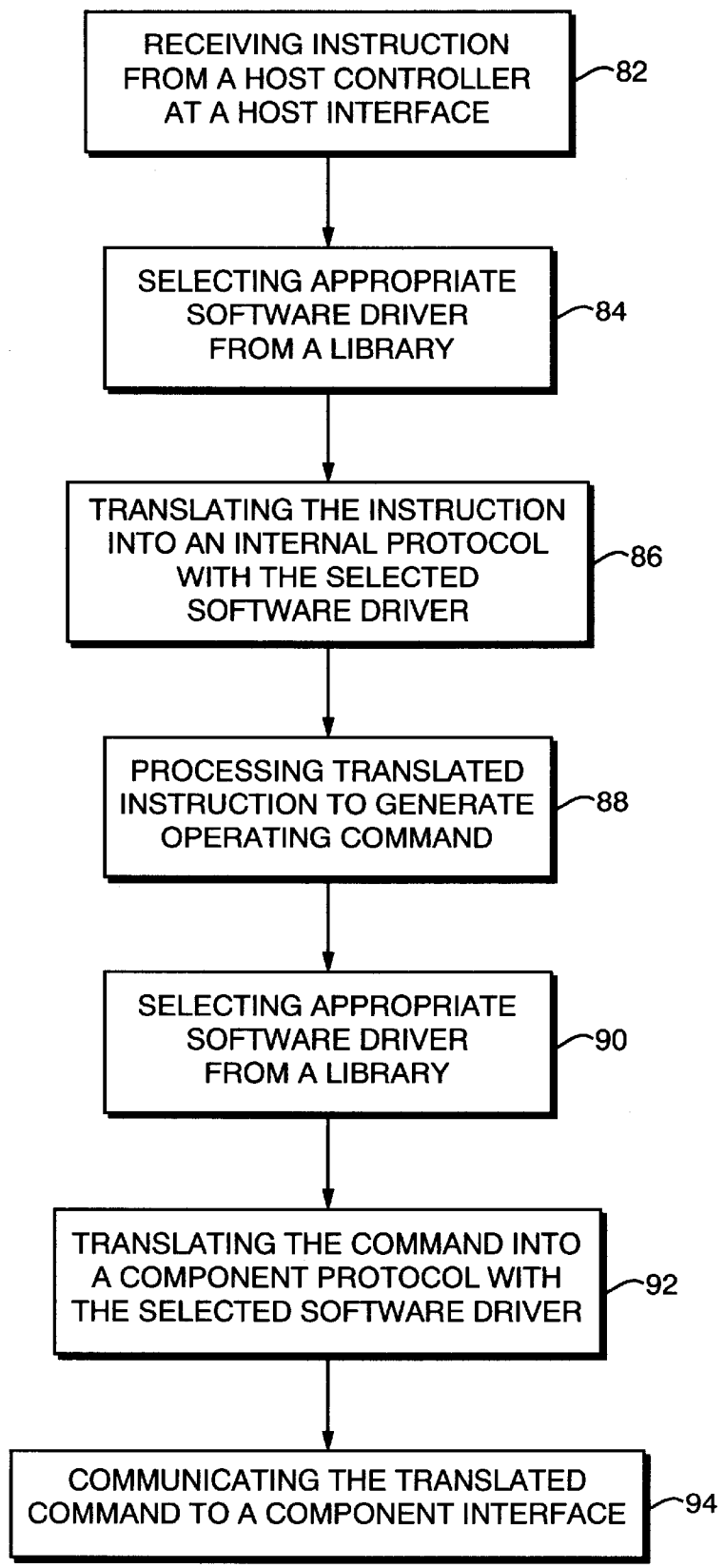
FIG. 6 is a flow chart illustrating the processing steps performed by a vacuum network controller in a method of this invention.

A computer-software-based process for processing this instruction is illustrated in the form of a flow chart in FIG. 6. After receiving 82 the instruction at a host interface 61 (FIG. 4), the vacuum network controller 12 (FIGS. 1, 4 and 5) then selects 84 the appropriate software driver from a library, which includes software drivers for translating BitBus, RS-232, RS-485, DeviceNet, EtherNet, TCP/IP, ProfiBus and Echelon into a generic protocol internal to the vacuum network. Software drivers for other protocols currently in existence as well as those that are yet to be developed are likewise incorporated into the library as need develops. In one embodiment, that generic internal protocol is built on a Win32 operating system (Microsoft Corp.). The identity and nature of the internal protocol that is selected is generally of no real significance, however. Next, the software driver translates 86 the host's instruction into the internal protocol. The translated host instruction is then processed 88 by the processor 74 (FIG. 4) to generate specific operating commands (e.g., commands to close the appropriate gate valve 28 (FIG. 1) and warm the appropriate cryopump 20) to effect the result sought by the host instruction based on the vacuum network controller 12's knowledge of the components that are in the network and their operational status. Again, an appropriate software driver is selected 90 from a library of drivers for translating the generic internal protocol into a component protocol, such as (but, again, not limited to) BitBus, EtherNet, TCP/IP, RS-232, RS-485, DeviceNet, ProfiBus, or Echelon, and the software driver translates 92 the commands into the protocol of the selected driver. The translated commands are then communicated 94 to a component interface 68/70 (FIG. 4), from where they are delivered to the appropriate vacuum network component(s). The component(s), in turn, respond(s) to those commands.

The communication traffic between the vacuum network controller 12 and vacuum system components is typically bidirectional. For example, vacuum system components typically feed data regarding their operational status and measurements that they perform back to the vacuum network controller 12. The component can send data to the vacuum network controller 12 on its own volition or in response to a prompt for such data from the vacuum network controller 12. Data from the component is received at a component interface 68/70 of the vacuum network controller 12. The vacuum network controller 12 then selects the appropriate software driver from a library including drivers for translating BitBus, Ethernet, TCP/IP, RS-232, RS-485, DeviceNet, ProfiBus, Echelon and analog signals into the generic internal protocol. The translated data is then processed by the processor 74 (FIG. 4) into basic status information to be forwarded to the host controller 16 and/or a display or used to generate specific operating commands. One example where the vacuum network controller 12 processes component data to generate operating commands includes use of the event generator 60. For example, the event generator 60 can be programmed to monitor the temperature of a component and, if the temperature of that component rises above a given value, to respond by either shutting down the component, initiating countermeasures, or notifying the system user. The specific nature of the response is pre-defined by the system user.

The vacuum network controller 12 also communicates with the network user through the graphical user interface 66. Further still, the vacuum network controller 12 communicates with technicians through the service interface 58, which provides programming capabilities to afford manual control over the vacuum system and its components.

Finally, the vacuum network controller 12 communicates through a server 44 and by modem 42 with a remote central controller 40 located at a separate site from the vacuum network. The vacuum network controller 12 sends information regarding network operation to the remote central controller 40. Further, the remote central controller 40 can send a prompt to the vacuum network controller 12 to request this information. The remote central controller 40 is likewise linked to dozens of similar vacuum networks. As a result, the remote central controller 40 develops an extensive database of observations of network operation, and it draws upon this database to analyze network problems as they develop. Further, the remote central controller 40 monitors the success of various responses to particular network problems to augment its ability to issue or suggest a response for dealing with new problems as they arise. Accordingly, the vacuum network controller 12 can call on the remote central controller 40 to assist in diagnosing and responding to perceived problems in vacuum network operation.

In addition, the remote central controller 40 periodically prompts the vacuum network controller 12 for information regarding the performance of vacuum system components. As a result, the remote central controller 40 can perform predictive diagnostics to detect problems such as aging of a component. Cryopumps 20, for example, typically show signs of aging before they fail after exhausting their useful lives. By analyzing operating data, such as that relating to temperatures, pressures, displacer speeds, and/or motor torque, the remote central controller 40 can recognize the aging of a cryopump 20. When it recognizes aging, the remote central controller 40 sends instructions back to the vacuum network controller 12 to take remedial action (e.g, to increase the rate of displacer reciprocation within the aged cryopump 20) and sends a message to the service technician to replace that cryopump 20 during the next scheduled maintenance outing. The capacity to promptly detect and predict component problems greatly advances the goal of being able to perform all necessary maintenance during scheduled maintenance trips. Of course, if the condition of a component is recognized as being imminently dire, the remote central controller 40 can direct maintenance to be performed before the component ceases to function at an acceptable level of effectiveness. Accordingly, the risk of network downtime due to component failure can be significantly reduced.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A vacuum network controller comprising:
   a processor;
   a host interface in communication with the processor for interfacing with a host controller;
   a component interface in communication with the processor, comprising a plurality of interfaces for interfacing with respective vacuum system components, including vacuum system components other than vacuum pumps, using distinct communication protocols; and
   a computer-readable medium in communication with the processor, the computer-readable medium storing computer-executable software code for:
      generating commands to control vacuum system components;
      selecting from a library of component software drivers for a plurality of communication protocols;
      translating the commands into the control vacuum system components' respective communication protocols with the selected component software driver; and
      communicating the translated commands to the respective component interfaces.

2. The vacuum network controller of claim 1, the software code being able to translate the software-generated commands into more than one communication protocol selected from the group consisting of BitBus, EtherNet, TCP/IP, RS-232, RS-485, DeviceNet, ProfiBus, and Echelon.

3. The vacuum network controller of claim 1, the software code being able to process data received from vacuum system components.

4. The vacuum network controller of claim 3, the software code being able to process data received from a sensor selected from the group consisting of a residual gas analyzer, an ion gauge, and a capacitance manometer.

5. The vacuum network controller of claim 3, the software code being able to process data received from a tool selected from the group consisting of a roughing pump, a compressor, a turbopump, and a gate valve.

6. The vacuum network controller of claim 3, wherein the software code enables the processor to process data transmitted from vacuum system components to the component interface in a protocol selected from the group consisting of BitBus, EtherNet, TCP/IP, RS-232, RS-485, DeviceNet, ProfiBus, Echelon, and analog.

7. The vacuum network controller of claim 1, the software code further being able to translate a plurality of communication protocols to and from the host interface.

8. The vacuum network controller of claim 7, the software code being able to translate more than one communication protocol selected from the group consisting of BitBus, EtherNet, TCP/IP, RS-232, RS-485, DeviceNet, ProfiBus, and Echelon to and from the host interface.

9. The vacuum network controller of claim 7, the software code further being able to generate a command derived from an instruction received from the host controller.

10. The vacuum network controller of claim 1, the computer-executable software code further for:
   processing component data; and
   generating a command for controlling a component other than a cryopump.

11. The vacuum network controller of claim 10, wherein the component other than a cryopump is a roughing pump.

12. The vacuum network controller of claim 10, wherein the component other than a cryopump is a compressor.

13. The vacuum network controller of claim 10, wherein the component other than a cryopump is a gate valve.

14. The vacuum network controller of claim 10, wherein the component other than a cryopump is a turbopump.

15. The vacuum network controller of claim 1, the computer-readable medium further storing computer-executable code for:
   coordinating and controlling operation of common resources of the vacuum system.

16. A vacuum network, comprising:
   a vacuum network controller, including:
      a processor;
      a host interface in communication with the processor for interfacing with a host controller;
      a component interface in communication with the processor, comprising a plurality of interfaces for interfacing with respective vacuum system components, including vacuum system components other than vacuum pumps, using distinct communication protocols;
      a computer-readable medium in communication with the processor, the computer-readable medium storing computer-executable software code for:
         generating commands to control vacuum system components;
         selecting from a library of component software drivers for a plurality of communication protocols;
         translating the commands into the control vacuum system components' respective communication protocols with the selected component software driver; and
         communicating the translated commands to the respective component interfaces; and
   a plurality of vacuum system components in communication with the component interface, different members of the plurality of vacuum system components responding to distinct communication protocols.

17. The vacuum network of claim 16, further comprising a host controller in communication with the host interface.

18. The vacuum network of claim 16, further comprising a cryopump in communication with the component interface.

19. The vacuum network of claim 16, further comprising a roughing pump in communication with the component interface.

20. The vacuum network of claim 16, further comprising a compressor in communication with the component interface.

21. The vacuum network of claim 16, further comprising a turbopump in communication with the component interface.

22. The vacuum network of claim 16, further comprising a gate valve in communication with the component interface.

23. The vacuum network of claim 16, further comprising a remote central controller in communication with the vacuum network controller.

24. The vacuum network of claim 23, wherein the remote central controller is in communication with a plurality of other vacuum network controllers.

25. The vacuum network of claim 16, further comprising a plurality of cryopumps in communication with the component interface, the cryopumps being responsive to distinct command codes.

26. A method embedded in a set of computer-translatable instructions performed in a controller for controlling a vacuum network, the method comprising the steps of:
   a) receiving an instruction from a host controller;
   b) processing the instruction to generate a command for controlling a vacuum system component;
   c) selecting from a library of component software drivers for a plurality of communication protocols;
   d) translating the command into one of the plurality of communication protocols with the selected component software driver for the vacuum system component; and
   e) communicating the translated command to one of a plurality of component interfaces to control the operation of the vacuum system component.

27. The method of claim 26, wherein the selected software driver is from the group consisting of BitBus, Ethernet, TCP/IP, RS-232, RS-485, DeviceNet, ProfiBus, and Echelon.

28. The method of claim 26, further comprising the steps of:
   selecting from a library of host-controller software drivers; and
   translating the instruction into another protocol with the selected host-controller software driver.

29. The method of claim 26, wherein the operation of a cryopump is controlled.

30. The method of claim 29, wherein a second command for controlling a vacuum system component is generated and steps (c), (d) and (e) are repeated to control the operation of a second vacuum system component.

31. The method of claim 30, wherein the second command is translated into a communication protocol distinct from the communication protocol into which the first command is translated.

32. The method of claim 31, wherein the second vacuum system component is a roughing pump.

33. The method of claim 31, wherein the second vacuum system component is a compressor.

34. The method of claim 31, wherein the second vacuum system component is a gate valve.

35. The method of claim 31, wherein the second vacuum system component is a second cryopump.

36. The method of claim 31, further comprising the steps of:
   receiving data from the two vacuum system components; and
   using that data to diagnose a problem in the vacuum network.

37. The method of claim 36, further comprising the step of controlling the operation of at least one of the vacuum system components to remedy the diagnosed problem.

38. The method of claim 31, further comprising the step of auto-configuring a replacement for an old vacuum system component by building a file of operation parameters for the old vacuum system component and loading those parameters into a new vacuum system component installed to replace the old vacuum system component.

39. The method of claim 31, further comprising the steps of:
   identifying vacuum system components in the vacuum network; and
   building routing tables for distributing data from vacuum system components and for distributing commands for operating the vacuum network based on the identity of vacuum system components.

40. The method of claim 26, further comprising the step of using a remote central controller to monitor the vacuum network as well as a plurality of other vacuum networks.

41. The method of claim 40, further comprising the step of using the remote central controller to control the vacuum networks.

42. The method of claim 41, wherein the remote central controller logs data received while monitoring the vacuum networks and compares additional data received while monitoring a member of the vacuum networks with the logged data to diagnose and remedy a problem in the member.

43. A method embedded in a set of computer-translatable instructions performed in a controller for controlling a vacuum network, the method comprising the steps of:
   receiving an instruction from a host controller;
   translating the instruction into an internal protocol;
   processing the translated instruction to generate a command for controlling a vacuum system component;
   selecting from a library of component software drivers for a plurality of communication protocols;
   translating the command into a component protocol with the selected component software driver for the vacuum system component; and
   communicating the translated command to one of a plurality of component interfaces to control the operation of the vacuum system component.

44. The method of claim 43, wherein the step of translating the command into a communication protocol includes the steps of:
   selecting from a library of component software drivers for a plurality of communication protocols; and
   translating the command into one of the plurality of communication protocols with the selected software driver.

45. A vacuum network controller comprising:
   a host interface for communicating with a tool host;
   a component interface comprising a plurality of interfaces for communicating with components of a vacuum network, including vacuum system components other than vacuum pumps;
   a processor programmed to control the components of the vacuum network; and a library of component software drivers for a plurality of communication protocols
   means for translating commands from the processor into any of a plurality of communication protocols with a selected component software driver for communicating with the respective components of the vacuum network.

* * * * *